US009284166B2

(12) United States Patent
Stuehrwoldt

(10) Patent No.: US 9,284,166 B2
(45) Date of Patent: Mar. 15, 2016

(54) SELF-PROPELLED WORK MACHINE

(71) Applicant: Manitowoc Crane Group France SAS, Dardilly Cedex (FR)

(72) Inventor: Dieter Stuehrwoldt, Wilhelmshaven (DE)

(73) Assignee: Manitowoc Crane Group France SAS, Dardilly (FR)

( * ) Notice: Subject to any disclaimer, the term of this patent is extended or adjusted under 35 U.S.C. 154(b) by 0 days.

(21) Appl. No.: 14/039,693

(22) Filed: Sep. 27, 2013

(65) Prior Publication Data
US 2014/0090907 A1    Apr. 3, 2014

(30) Foreign Application Priority Data

Oct. 1, 2012 (DE) ...................... 20 2012 009 418 U

(51) Int. Cl.
*B66C 23/40* (2006.01)
*B66C 23/44* (2006.01)
*B60K 25/00* (2006.01)
*B60K 17/16* (2006.01)

(52) U.S. Cl.
CPC ............... *B66C 23/40* (2013.01); *B60K 17/16* (2013.01); *B60K 25/00* (2013.01); *B66C 23/44* (2013.01)

(58) Field of Classification Search
CPC ........ B60K 17/16; B60K 17/28; B60K 25/00; B60K 25/06
USPC ................ 180/53.4, 53.1, 53.8, 89.13, 89.16, 180/89.19, 312; 212/172, 174, 223; 3/53.4, 3/53.1, 53.8, 89.13, 89.16, 89.19, 312
See application file for complete search history.

(56) References Cited

U.S. PATENT DOCUMENTS

| 1,595,029 | A | | 8/1926 | Smith et al. |
| 1,771,333 | A | | 7/1930 | Joret |
| 1,917,053 | A | | 3/1931 | Nelson et al. |
| 2,438,539 | A | * | 3/1948 | Cook ............................ 74/15.4 |
| 2,731,097 | A | * | 1/1956 | Zeilman .................. B60K 5/08 |
| | | | | 180/24 |

(Continued)

FOREIGN PATENT DOCUMENTS

DE    102008047737 A1    4/2010
DE    10 2011 108 893 A1    1/2013

(Continued)

OTHER PUBLICATIONS

German Search Report, dated Apr. 25, 2013, for DE 20 2012 009 418.1 (priority document).

(Continued)

*Primary Examiner* — Barry Gooden, Jr.
(74) *Attorney, Agent, or Firm* — Brinks Gilson & Lione; Craig Buschmann

(57) ABSTRACT

A self-propelled work machine, in particular a mobile crane, comprises an undercarriage configured for moving the work machine, a superstructure which is rotatably mounted on the undercarriage, and a drive device comprising a drive motor. The drive device comprises a moment transmission which is formed between the superstructure and the undercarriage and configured to transmit power outputted by the drive motor between the superstructure and the undercarriage in the form of a moment. At least one and, in particular, all of the elements to be driven receive a moment about an axis which extends in the region of a rotary bearing of the superstructure and the undercarriage, in particular about the rotational axis of the superstructure.

18 Claims, 2 Drawing Sheets

(56) References Cited

U.S. PATENT DOCUMENTS

| | | | | |
|---|---|---|---|---|
| 3,480,156 A | * | 11/1969 | Pensa | 212/289 |
| 3,599,814 A | * | 8/1971 | Brownfield | 414/718 |
| 4,036,508 A | * | 7/1977 | Eddy et al. | 280/492 |
| 4,044,902 A | * | 8/1977 | Eitel | B66F 11/046 182/2.1 |
| 4,177,869 A | * | 12/1979 | Crabiel | F16L 27/087 180/6.58 |
| 4,189,021 A | * | 2/1980 | Scheuerpflug et al. | 180/69.6 |
| 4,397,396 A | | 8/1983 | Kay et al. | |
| RE31,500 E | * | 1/1984 | Brownfield | 414/718 |
| 4,705,450 A | * | 11/1987 | Gano | 414/687 |
| 4,771,855 A | * | 9/1988 | Takashima et al. | 180/326 |
| 5,147,254 A | * | 9/1992 | Baier et al. | 475/121 |
| 6,382,341 B1 | * | 5/2002 | Hashimoto et al. | 180/312 |
| 6,688,481 B1 | | 2/2004 | Adner et al. | |
| 8,336,650 B2 | * | 12/2012 | Wernicke et al. | 180/53.4 |
| 2004/0178007 A1 | * | 9/2004 | Ima | 180/53.1 |
| 2008/0308327 A1 | * | 12/2008 | Liljeblad et al. | 180/53.4 |
| 2010/0051570 A1 | | 3/2010 | Wernicke et al. | |
| 2013/0025948 A1 | | 1/2013 | Morath et al. | |

FOREIGN PATENT DOCUMENTS

| | | |
|---|---|---|
| EP | 1 090 874 A1 | 4/2001 |
| JP | S 57-074386 U | 10/1955 |
| JP | H05 12489 U | 2/1993 |
| JP | 2001-348186 | 12/2001 |
| JP | 2010-521391 A | 6/2010 |
| JP | 2012-126464 A | 7/2012 |

OTHER PUBLICATIONS

English translation of Office Action in corresponding Japanese Application No. 2013-204515, dated Aug. 26, 2014 (12 pages).

Extended European Search Report in corresponding European Application No. 13183291.7, dated Jan. 28, 2015 (6 pages). English translation is not available.

* cited by examiner

SELF-PROPELLED WORK MACHINE

RELATED APPLICATIONS

The present patent document claims the benefit of priority to German Patent Application No. 20 2012 009 418.1, filed Oct. 1, 2012, and entitled "SELF-PROPELLED WORK MACHINE," the entire contents of each of which are incorporated herein by reference.

BACKGROUND

The present invention relates to a self-propelled work machine, in particular a mobile crane, comprising an undercarriage configured for moving the work machine, a superstructure which is rotatably mounted on the undercarriage, and a drive device comprising a drive motor.

Modern mobile cranes comprise a drive motor, the outputted power of which is used to move the mobile crane between sites of operation. These are usually diesel engines which are arranged fixedly on the undercarriage. In order to also provide power to the superstructure and the units assigned to the superstructure, another diesel engine is arranged on the superstructure in most cases. Stricter legal provisions with regard to observing axial loads and emission limits have more recently prompted a changeover to replacing the diesel engine assigned to the superstructure with a hydraulic energy transmission leading from the undercarriage to the superstructure, such that the drive motor on the undercarriage, formerly provided solely for moving the mobile crane, can also provide power to the superstructure. However, high power losses in the transmission of energy and problems due to leaks are associated with such systems.

BRIEF SUMMARY

It is an object of the present invention to provide a self-propelled work machine, in particular a mobile crane, which overcomes the problems mentioned above. It is in particular an object of the present invention to increase the reliability and energy efficiency of a self-propelled work machine or mobile crane while observing predefined axial loads and emission limits.

This object is solved by the subject-matter of Claim 1. The sub-claims advantageously develop the subject-matter in accordance with the invention.

For the sake of simplicity, the present invention shall be described in the following using the example of a mobile crane, wherein the concept in accordance with the invention can of course be applied to any self-propelled work machines comprising an undercarriage and a superstructure which is rotatably mounted on the undercarriage, for example other lifting equipment or construction machines, in particular diggers.

The mobile crane in accordance with the invention comprises an undercarriage configured for moving the mobile crane, a superstructure which is rotatably mounted on the undercarriage, and a drive device comprising a drive motor, wherein the drive device comprises a moment transmission which is formed between the superstructure and the undercarriage and configured to transmit power outputted by the drive motor between the superstructure and the undercarriage in the form of a moment.

In other words, the mobile crane in accordance with the invention comprises a drive motor which supplies both the undercarriage and the superstructure with power, wherein it is conceivable for this drive motor to be the only drive motor or internal combustion engine of the mobile crane, wherein an electric motor is likewise conceivable as an alternative to an internal combustion engine. In order to make the power outputted by the motor available to units which are not mounted stationary relative to the drive motor, i.e. if the drive motor is arranged on the undercarriage and the units are arranged on the superstructure or if the drive motor is arranged on the superstructure and the units are arranged on the undercarriage, the present invention envisages a moment transmission as part of the drive device of the mobile crane, in order to transmit power outputted by the drive motor between the superstructure and the undercarriage as a moment.

The hydraulic rotary union between the undercarriage and the superstructure, as hitherto known in the prior art, is thus no longer necessary, such that there is also no danger of leakage losses.

In accordance with a preferred embodiment of the present invention, the drive motor is assigned to the undercarriage of the mobile crane. The drive motor which in known cranes is provided for moving the mobile crane can instead fulfill the task of supplying both the superstructure and the undercarriage with power.

In accordance with another preferred embodiment of the present invention, the moment transmitted between the superstructure and the undercarriage is transmitted about an axis which extends in the region of the rotary bearing of the superstructure and the undercarriage, in particular about the rotational axis of the superstructure. Transmission means which are suitable for such purposes are known to the person skilled in the art, wherein the location and orientation of the moment axis is not immediately relevant to implementing the present invention. An embodiment in which the moment to be transmitted is transmitted about the rotational axis of the superstructure is however preferred.

For transmitting the moment, a shaft can be provided which extends between the superstructure and the undercarriage, such that the moment to be transmitted is channeled into the shaft in the region of the undercarriage and channeled out of the shaft in the region of the superstructure, or vice versa. Instead of a shaft, however, it is equally conceivable to provide other suitable means for transmitting torque between the superstructure and the undercarriage which are known to the person skilled in the art, for example couplings, torque converters or gearboxes, which form an interface between the superstructure and the undercarriage.

In accordance with another preferred embodiment, the moment transmission comprises a gearbox which is in particular arranged in the region of the rotary bearing of the superstructure and the undercarriage. An angular gearbox into which a moment is channeled at the motor end and out of which a moment is channeled at the rotary bearing end is particularly preferred in this case. A suitable output speed of the gearbox can advantageously be achieved by means of a corresponding gear ratio. It is thus possible to use small and cheap units to be driven, such as for example hydraulic pumps.

It is conceivable for the gearbox or angular gearbox to output a moment about the rotational axis of the superstructure or about an axis extending parallel to the rotational axis in the region of the rotary bearing or about an axis coincident with the rotational axis.

In accordance with another preferred embodiment, the gearbox or angular gearbox is connected, rotationally fixed, to the superstructure or to the undercarriage, in accordance with the dependency of the transmission device. If a drive moment is to be relayed to the superstructure by the gearbox, the gearbox must consequently be connected, rotationally fixed, to the undercarriage. Conversely, a gearbox which is connected, rotationally fixed, to the superstructure can output a moment in the direction of the undercarriage.

More preferably, the drive device comprises a transfer gearbox which is arranged in the force progression between the drive motor and the gearbox or angular gearbox and which divides the power outputted by the drive motor between a drive train provided for supplying power to the superstructure and a drive train provided for supplying power to the undercarriage, wherein a transfer gearbox which can divide the power outputted by the drive motor variably between these drive trains in accordance with their respective power requirements is particularly preferred, wherein an option of blocking the drive trains is in particular conceivable.

It is also conceivable for at least some of the elements or units which are to be driven by the power of the drive motor to be arranged on the superstructure or undercarriage in the region of the rotary bearing of the superstructure and the undercarriage, in particular in the region of the rotational axis of the superstructure.

Preferably, the transmitted moment is then in particular received about the rotational axis of the superstructure. In other words, as many as possible of the elements or units to be driven are arranged in a line with respect to the angular gearbox and optimally on the rotational axis of the superstructure. Such elements to be driven can for example be hydraulic pumps of the superstructure. At least one and in particular all of the elements or units to be driven thus particularly preferably receive a moment about the rotational axis of the superstructure.

In accordance with other preferred embodiments, the hydraulic pump can be arranged parallel to the rotational axis of the superstructure in the region of the rotary bearing. It is also conceivable for the moment transmission to comprise a shaft which extends between the superstructure and the undercarriage and which in particular does not extend parallel to the rotational axis of the superstructure.

The gearbox which is arranged in the region of the rotary bearing can also comprise an output shaft which extends parallel to the rotational axis of the superstructure, and the rotational axis of which in particular does not lie on the rotational axis of the superstructure.

The transfer gearbox can also be configured such that it not only divides and/or variably divides the power outputted by the motor between the drive train for the superstructure and the drive train for the undercarriage, but also completely shuts down one of the drive trains and "toggles" between the superstructure drive train and the undercarriage drive train, so to speak. All the power outputted by the transfer gearbox is thus supplied to one of these drive trains.

It is also possible for the drive device to use power outputted by the drive motor for driving the superstructure. At least one element to be driven can also comprise an input shaft, the rotational axis of which in particular extends parallel to the rotational axis of the superstructure and/or does not lie on the rotational axis of the superstructure.

BRIEF DESCRIPTION OF THE DRAWINGS

In the following, the present invention is explained in more detail on the basis of a preferred embodiment and by referring to the enclosed figures. The present invention can comprise any of the features described here, individually and in any expedient combination. There is shown.

DETAILED DESCRIPTION

Figure 1:
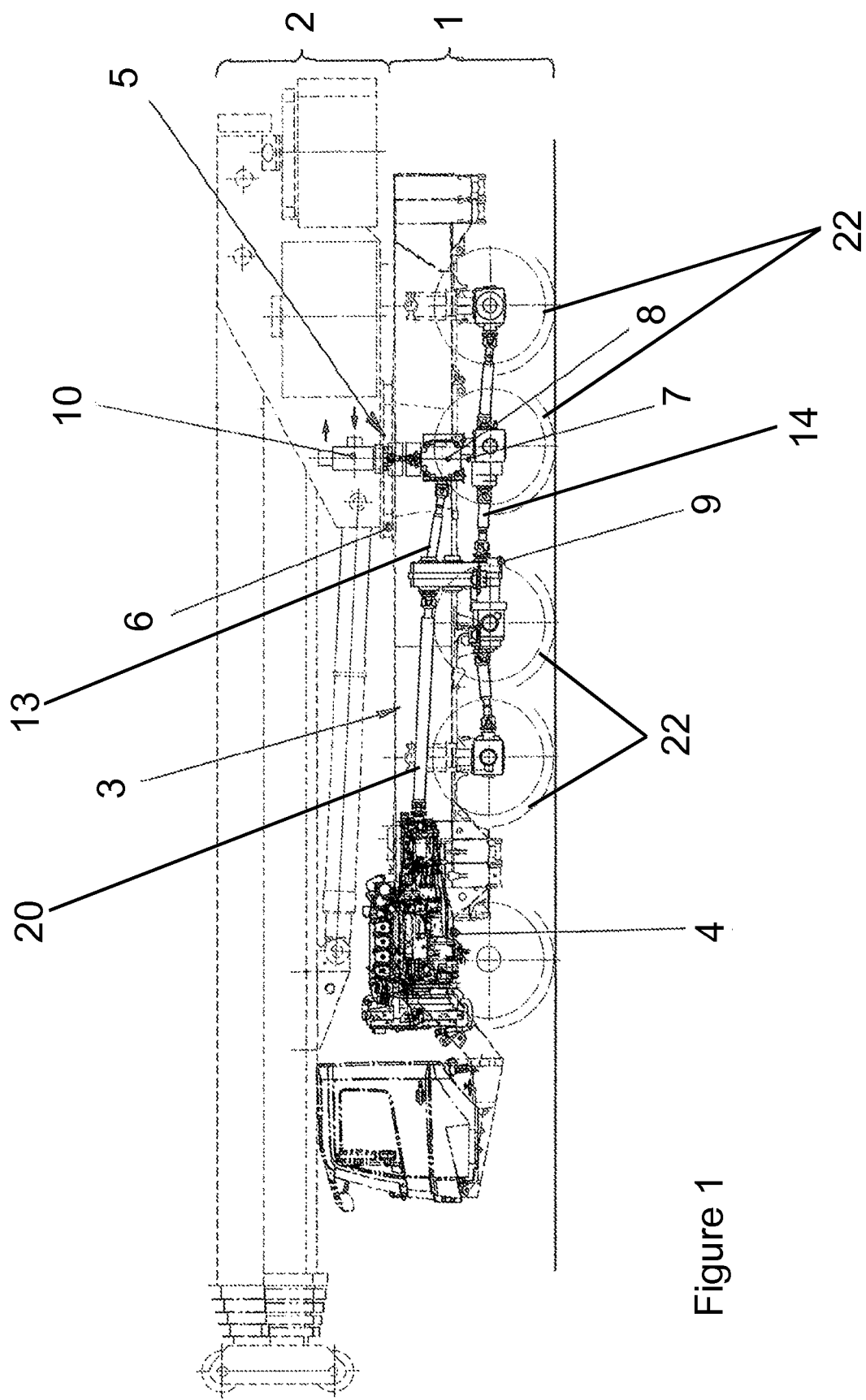
FIG. 1—An outline of a mobile crane in accordance with the invention, comprising a moment transmission formed between the superstructure and the undercarriage.

FIG. 1 shows an outline of a mobile crane in accordance with the invention, which comprises an undercarriage 1, a superstructure 2 which is rotatably mounted on the undercarriage 1, and a drive device 3. The drive device 3 comprises a drive motor 4 which is arranged on the undercarriage 1 and outputs power onto a transfer gearbox 9 via a manual gearbox (not indicated) and a drive shaft 20.

The transfer gearbox 9 serves as a power split and relays power both to the drive wheels 22 of the mobile crane via one shaft or drive train 14 and to an angular gearbox 8 via another shaft or drive train 13. In order to cater to the respective power requirements of the superstructure 2 and the undercarriage 1, the proportion of power outputted onto the superstructure 2 or the undercarriage 1 can be varied by means of the transfer gearbox 9, up to and including blocking one or other of the drive trains 13 and 14.

The angular gearbox 8 is arranged on the rotational axis 7 of the superstructure 2 and outputs a torque about this axis in the direction of the superstructure 2.

A hydraulic pump 10 is arranged around the rotational axis 7 on the superstructure 2 and receives the moment outputted by the angular gearbox 8 and supplies the superstructure 2 with hydraulic power.

Figure 2:
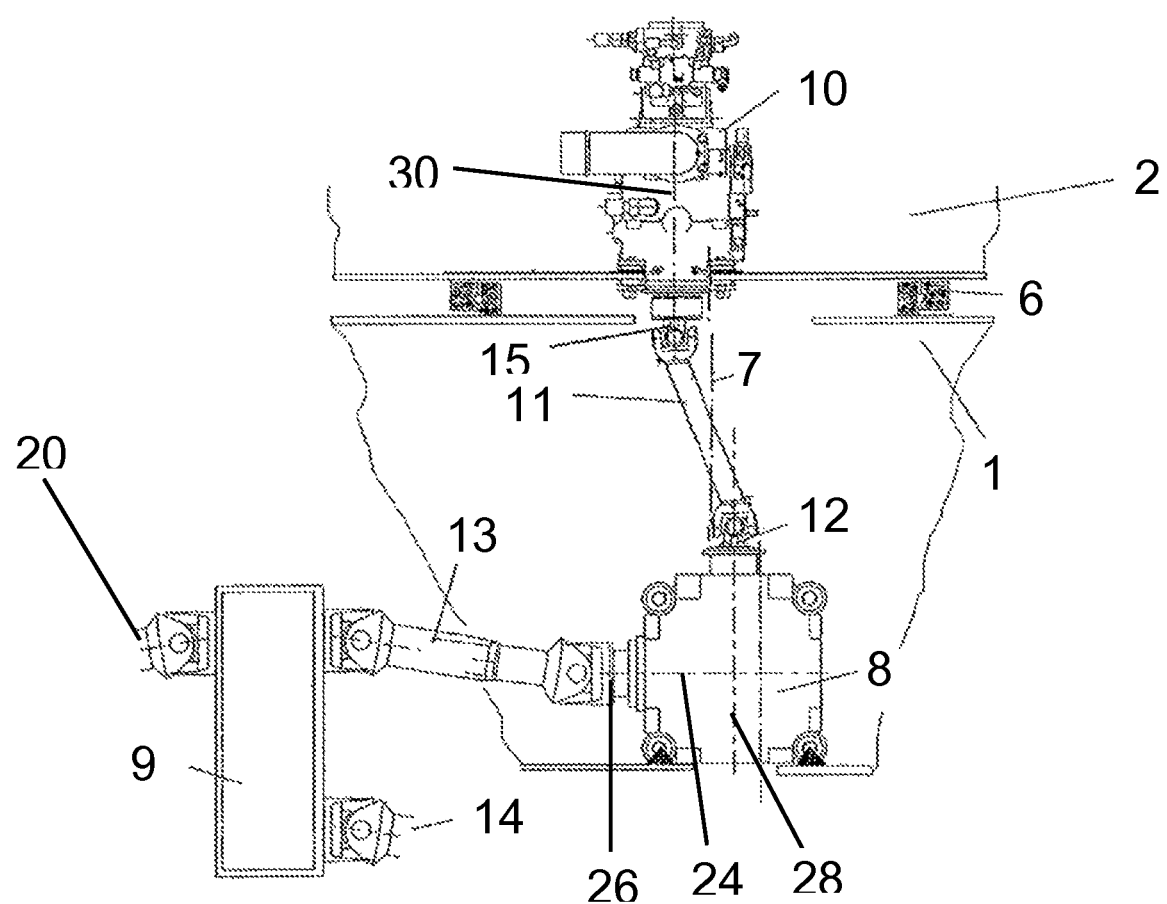
FIG. 2—A preferred embodiment of the moment transmission in accordance with the invention.

FIG. 2 shows a particularly preferred embodiment of the moment transmission 5 (FIG. 1) in accordance with the invention. The power outputted by the drive motor 4 illustrated in FIG. 1 is supplied to the transfer gearbox 9 via the shaft 20 shown on the left in the image, wherein the transfer gearbox 9 divides this power between the drive trains 13 and 14 in accordance with requirements or completely switches off one of these drive trains 13, 14 and makes all the power available to the other drive train, respectively. While the drive train 14 is provided in the undercarriage 1, for driving the vehicle among other things, the drive train 13 (prop shaft 13) relays the power outputted by the gearbox 9 to another gearbox 8. By means of this gearbox 8, the moment which is rotated about a substantially horizontally extending axis 24 (about the input shaft 26 of the gearbox 8 which connects to the drive train or prop shaft 13) is converted into a moment which is rotated about a vertical axis 28 (about the output shaft 12) and outputted via the output shaft 12. It can be seen that the rotational axis 28 of the output shaft 12 extends parallel to the rotational axis 7 of the superstructure 2, but does not coincide with it. (The axis 28 optionally does coincide with the rotational axis 7 in some embodiments.) The same applies to the rotational axis 30 of the input shaft 15 which is assigned to the hydraulic pump 10. Another prop shaft 11 is provided between and connects to the output shaft 12 of the gearbox 8 and to the input shaft 15 of the pump 10, so as to transfer power in the form of a moment from the undercarriage 1 to the superstructure 2. Since neither the output shaft 12 nor the input shaft 15 extends on the rotational axis 7 of the superstructure 2, the shaft 11 extends obliquely with respect to the rotational axis 7, i.e. it neither lies on nor extends parallel to the rotational axis 7.

As soon as the superstructure 2 is rotated relative to the undercarriage 1 via the rotary bearing 6, the relative location of the shafts 12 and 15 is changed. Optionally, the prop shaft 11 therefore can be configured to be variable in length in order to compensate for the location and the position of the superstructure 2 relative to the undercarriage 1.

The invention claimed is:

1. A self-propelled work machine, comprising an undercarriage configured for moving the work machine, a superstructure which is rotatably mounted on the undercarriage, and a drive device comprising a drive motor, wherein the drive device comprises a moment transmission which is formed between the superstructure and the undercarriage and configured to transmit power outputted by the drive motor between the superstructure and the undercarriage in the form of a moment, wherein at least one element to be driven receives a moment about an axis which extends in a region of a rotary bearing of the superstructure and the undercarriage characterised in that the moment transmission comprises a shaft which extends between the superstructure and the undercarriage and does not extend parallel to a rotational axis of the superstructure.

2. The work machine according to claim 1, wherein the drive motor is assigned to the undercarriage.

3. The work machine according to claim 1, wherein the drive device comprises a transfer gearbox which at least variably divides the power outputted by the drive motor between a drive train provided for supplying power to the superstructure and a drive train provided for supplying power to the undercarriage in accordance with a power requirement of the drive train of the superstructure and a power requirement of the drive train of the undercarriage.

4. The work machine according to claim 1, wherein the drive device uses the power outputted by the drive motor for driving the superstructure.

5. The work machine according to claim 1, wherein the at least one element to be driven comprises at least one of a hydraulic pump and an input shaft.

6. The work machine according to claim 1, wherein the moment transmission comprises at least one of:
   a gearbox arranged in the region of the rotary bearing of the superstructure and the undercarriage; and,
   at least one output shaft which extends parallel to the rotational axis of the superstructure and includes an axis that does not lie on the rotational axis of the superstructure.

7. The work machine according to claim 6, wherein the gearbox outputs a moment about the rotational axis of the superstructure.

8. The work machine according to claim 6, wherein the gearbox is connected and rotationally fixed to one of the superstructure and the undercarriage depending on a direction of transmission.

9. The work machine according to claim 1, wherein the at least one element is driven by the moment transmitted about the axis which extends in the region of the rotary bearing to the at least one element.

10. The work machine according to claim 9, wherein at least one of the moment received by the at least one element and the moment transmitted to the at least one element extends about the rotational axis of the superstructure.

11. The work machine according to claim 9, wherein at least one of the moment received by the at least one element and the moment transmitted to the at least one element extends parallel to the rotational axis of the superstructure.

12. The work machine according to claim 9, wherein at least one of the moment received by the at least one element and the moment transmitted to the at least one element does not lie on the rotational axis of the superstructure.

13. A self-propelled work machine comprising:
   an undercarriage configured for moving the work machine;
   a superstructure rotatably mounted to the undercarriage, the superstructure configured to rotate about a rotational axis;
   a rotary bearing connected to the undercarriage and the superstructure;
   a drive device that includes:
      a drive motor that outputs power;
      a moment transmission positioned between the superstructure and the undercarriage and configured to transmit the power in the form of a moment between the superstructure and the undercarriage, wherein the moment transmission comprises a shaft which extends between the superstructure and the undercarriage and does not extend parallel to the rotational axis of the superstructure; and
      a pump configured to receive the moment about an axis that extends about the rotational axis of the superstructure.

14. The work machine of claim 13, wherein the drive device further comprises a transfer gearbox which at least variably divides the power outputted by the drive motor between a drive train provided for supplying power to the superstructure and a drive train provided for supplying power to the undercarriage in accordance with a power requirement of the drive train of the superstructure and a power requirement of the drive train of the undercarriage.

15. The work machine of claim 13, wherein the work machine comprises a mobile crane and the drive motor is coupled to the undercarriage.

16. The work machine of claim 13, wherein the moment transmission comprises at least one of a gearbox arranged in a region of the rotary bearing and at least one output shaft configured to transmit the moment about the axis that extends in the region of the rotary bearing and about the rotational axis of the superstructure.

17. The work machine of claim 16, wherein at least one of the axis at which the moment is received by at least one of the pump and the shaft and the axis at which the moment is transmitted from at least one of the gearbox and the output shaft extends parallel to the rotational axis of the superstructure.

18. The work machine of claim 16, wherein at least one of the axis at which the moment is received by at least one of the pump and the shaft and the axis at which the moment is transmitted from at least one of the gearbox and the output shaft does not lie on the rotational axis of the superstructure.

* * * * *